United States Patent
Winterling et al.

(10) Patent No.: US 7,285,601 B2
(45) Date of Patent: Oct. 23, 2007

(54) INHERENTLY CROSSLINKABLE POLYAMIDES

(75) Inventors: Helmut Winterling, Ludwigshafen (DE); Jürgen Deininger, Oftersheim (DE); Kurt Krempel, Rödersheim-Gronau (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/511,107

(22) PCT Filed: Apr. 14, 2003

(86) PCT No.: PCT/EP03/03830

§ 371 (c)(1), (2), (4) Date: Oct. 14, 2004

(87) PCT Pub. No.: WO03/087193

PCT Pub. Date: Oct. 23, 2003

(65) Prior Publication Data

US 2005/0159579 A1    Jul. 21, 2005

(30) Foreign Application Priority Data

Apr. 18, 2002 (DE) ............................... 102 17 433

(51) Int. Cl.
*C08L 77/00* (2006.01)
*C08F 283/04* (2006.01)

(52) U.S. Cl. ............... 525/421; 528/345; 528/310; 528/332; 525/426

(58) Field of Classification Search ............... 528/310, 528/345, 332; 525/421, 426
See application file for complete search history.

(56) References Cited

U.S. PATENT DOCUMENTS

| | | | |
|---|---|---|---|
| 4,595,730 A * | 6/1986 | Blondel et al. | ............. 525/178 |
| 5,294,688 A * | 3/1994 | Rehmer et al. | ............. 526/260 |
| 6,703,475 B1 * | 3/2004 | Deininger et al. | .......... 528/310 |
| 6,703,476 B2 * | 3/2004 | Mohrschladt et al. | ....... 528/310 |

FOREIGN PATENT DOCUMENTS

| | | |
|---|---|---|
| DE | 1 917 798 | 10/1970 |
| EP | 147 267 | 7/1985 |

OTHER PUBLICATIONS

Patent abstracts of Japan 02218711.

* cited by examiner

*Primary Examiner*—Ana Woodward
(74) *Attorney, Agent, or Firm*—Novak Druce & Quigg LLP

(57) ABSTRACT

A polyamide which contains a monoolefinically unsaturated compound chemically bonded at the end of the polymer chain, a process for preparing this polyamide, a polyamide obtainable by crosslinking this polyamide, and also fibers, films, and moldings, comprising at least one such polyamide.

6 Claims, 2 Drawing Sheets

INHERENTLY CROSSLINKABLE POLYAMIDES

TECHNICAL FIELD

Figure 1:
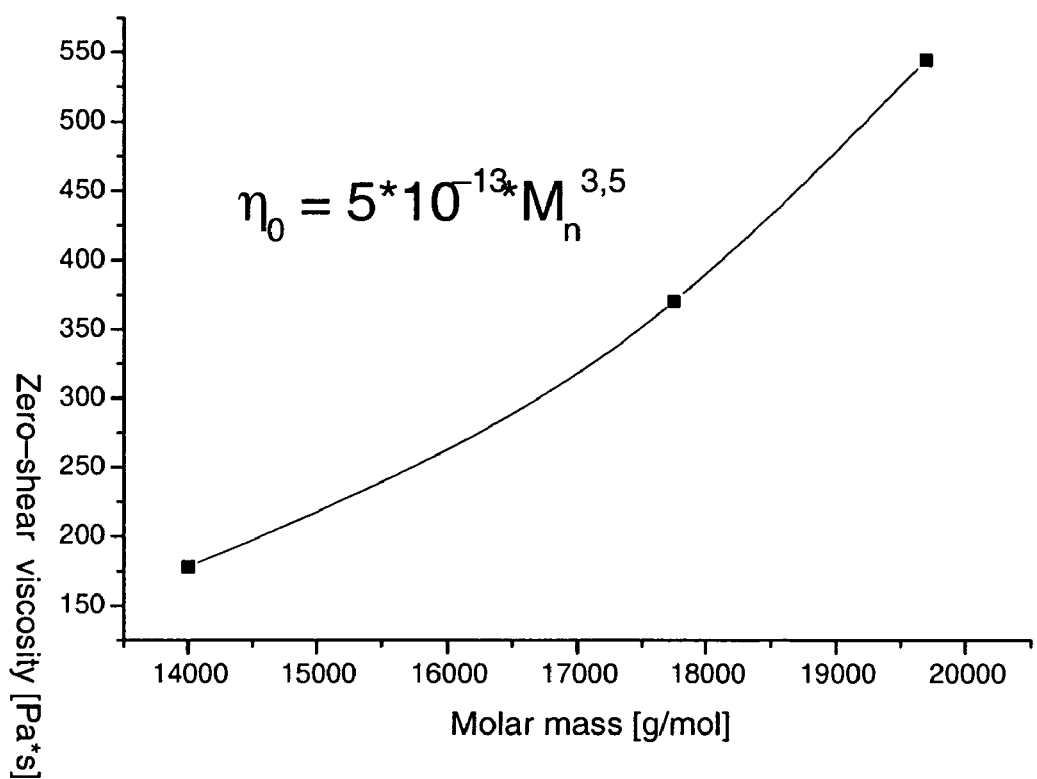

The present invention relates to a polyamide which contains a monoolefinically unsaturated compound chemically bonded to the end of the polymer chain.

It further relates to a process for preparing this polyamide, to a polyamide obtainable by crosslinking this polyamide, and to fibers, films, and moldings comprising at least one such polyamide.

BACKGROUND ART

Polyamides, in particular nylon-6, and nylon-6,6, are industrially significant polymers. They are usually prepared by reacting suitable monomers such as caprolactam, adipic acid, or hexamethylenediamine, in the presence of water.

Unless further measures are taken, this gives polyamides which during downstream steps of processing, such as injection molding, have a tendency to undergo uncontrolled molecular weight increase with a resultant impairment of processing properties. In particular, an increase in melt viscosity occurs (determined as a fall-off in the melt volume flow rate to EN ISO 1133), and in injection molding, for example, this leads to longer cycle time.

To stabilize the polyamide with respect to this type of uncontrolled molecular weight increase, it is usual to use chain regulators during the preparation of the polymer, an example being propionic acid.

These chain regulators can substantially suppress the molecular weight increase but in order to shorten cycle times in injection molding it is desirable to increase the melt volume flow rate of polyamides to EN ISO 1133 while the relative viscosity determined to DIN 51562-1 to -4, remains the same.

It is an object of the present invention to provide a process which, in a technically simple and cost-effective manner, permits the preparation of a polyamide which when compared with polyamides chain-regulated by conventional methods has higher melt volume flow rate to EN ISO 1133 while the relative viscosity determined to DIN 51562-1 to -4, remains the same.

DISCLOSURE OF THE INVENTION

We have found that this object is achieved by means of the polyamide defined at the outset, a process for its preparation, a polyamide obtainable by crosslinking this polyamide, and fibers, films, and moldings, comprising at least one such polyamide.

For the purposes of the present invention, polyamides are homopolymers, copolymers, mixtures, and grafts of synthetic long-chain polyamides which have repeat amide groups as a substantial constituent in the main polymer chain. Examples of these polyamides are nylon-6 (polycaprolactam), nylon-6,6 (polyhexamethyleneadipamide), nylon-4,6 (polytetramethylene-adipamide), nylon-6,10 (polyhexamethylenesebacimide), nylon-7 (polyenantholactam), nylon-11 (polyundecanolactam), nylon-12 (polydodecanolactam). These polyamides are known by the generic name nylon. For the purposes of the present invention, polyamides also include those known as aramids (aromatic polyamides), such as polymetaphenyleneisophthalimide (NOMEX® Fiber, U.S. Pat. No. 3,287,324), and polyparaphenyleneterephthalamide (KEVLAR® Fiber, U.S. Pat. No. 3,671,542).

MODE(S) FOR CARRYING OUT THE INVENTION

The preparation of polyamides may in principle take place by two methods.

During the polymerization of dicarboxylic acids and diamines, or polymerization of amino acids or derivatives of these, such as aminocarboxylic nitrites, aminocarboxamides, aminocarboxylic esters, or aminocarboxylic salts, the amino end groups and carboxy end groups of the starting monomers or starting oligomers react with one another to form an amide group and water. The water can then be removed from the polymer. During the polymerization of aminocarboxamides, the amino and amide end groups of the starting monomers or starting oligomers react with one another to form an amide group and ammonia. The ammonia can then be removed from the polymer. During the polymerization of aminocarboxylic esters, the amino and ester end groups of the starting monomers or starting oligomers react with one another to form an amide group and an alcohol. The alcohol can then be removed from the polymer. During the polymerization of aminocarboxylic nitrites the nitrile groups may firstly be reacted with water to give amide groups or carboxylic acid groups, and the resultant aminocarboxamides or aminocarboxylic acids can be reacted as described. This polymerization reaction is usually termed polycondensation.

The polymerization of lactams as starting monomers or starting oligomers is usually termed polyaddition.

The polyamides can be obtained by processes known per se, for example those described in DE-A-14 95 198, DE-A-25 58 480, EP-A-129 196 or in: Polymerization Processes, Interscience, New York, 1977, pp. 424-467, in particular pp. 444-446, from monomers selected from the group consisting of lactams, omega-amino-carboxylic acids, omega-aminocarbonitriles, omega-aminocarboxamides, omega-aminocarboxylic salts, omega-aminocarboxylic esters, equimolar mixtures of diamines and dicarboxylic acids, dicarboxylic acid/diamine salts, dinitriles and diamines, or mixtures of these monomers.

Monomers which may be used are a $C_2$-$C_{20}$, preferably $C_2$-$C_{18}$, arylaliphatic or preferably aliphatic lactam in the form of monomer or oligomer, examples being enantholactam, undecanolactam, dodecanolactam or caprolactam, $C_2$-$C_{20}$, preferably $C_3$-$C_{18}$, aminocarboxylic acids in the form of monomer or oligomer, examples being 6-aminocaproic acid, 11-aminoundecanoic acid, and the salts of these, such as alkali metal salts, e.g. lithium salts, sodium salts, potassium salts, $C_2$-$C_{20}$, preferably $C_3$-$C_{18}$, aminocarbonitriles in the form of monomer or oligomer, examples being 6-aminocapronitrile, 11-aminoundecanonitrile, $C_2$-$C_{20}$ aminocarboxamines in the form of monomer or oligomer, examples being 6-aminocapramide, 11-aminoundecanoamide, esters, preferably $C_1$-$C_4$-alkyl esters, e.g. methyl, ethyl, n-propyl, isopropyl, n-butyl, isobutyl, sec-butyl esters, of $C_2$-$C_{20}$, preferably $C_3$-$C_{18}$, aminocarboxylic acids, examples being 6-aminocaproates, such as methyl 6-aminocaproate, 11-aminoundecanoates, such as methyl 11-aminoundecanoate, a $C_2$-$C_{20}$, preferably $C_2$-$C_{12}$, alkyldiamine, such as tetramethylenediamine or preferably hexamethylenediamine, with a $C_2$-$C_{20}$, preferably $C_2$-$C_{14}$, aliphatic dicarboxylic acid or its mono- or dinitrile, examples being sebacic acid, dodecanedioic acid, adipic acid, sebaconitrile, decanonitrile, or adiponitrile, a C₂-C₂₀, preferably C₂-C₁₂, alkyldiamine in the form of monomer or oligomer, examples being tetramethylenediamine or preferably hexamethylenediamine, with a C₈-C₂₀, preferably C₈-C₁₂, aromatic dicarboxylic acid or derivatives thereof, such as chlorides, examples being 2,6-naphthalenedicarboxylic acid, and preferably isophthalic acid or terephthalic acid, a C₂-C₂₀, preferably C₂-C₁₂, alkyldiamine in the form of monomer or oligomer, examples being tetramethylenediamine or preferably hexamethylenediamine, with a C₉-C₂₀, preferably C₉-C₁₈, arylaliphatic dicarboxylic acid or derivatives thereof, such as chlorides, examples being o-, m- or p-phenylenediacetic acid, a C₆-C₂₀, preferably C₆-C₁₀, aromatic diamine in the form of monomer or oligomer, examples being m- and p-phenylenediamine, with a C₂-C₂₀, preferably C₂-C₁₄, aliphatic dicarboxylic acid or mono- or dinitriles thereof, examples being sebacic acid, dodecanedioic acid, adipic acid, sebaconitrile, decanonitrile, or adiponitrile, a C₆-C₂₀, preferably C₆-C₁₀, aromatic diamine in the form of monomer or oligomer, examples being m- and p-phenylenediamine, with a C₈-C₂₀, preferably C₈-C₁₂, aromatic dicarboxylic acid or derivatives thereof, such as chlorides, examples being 2,6-naphthalenedicarboxylic acid, and preferably isophthalic acid or terephthalic acid, a C₆-C₂₀, preferably C₆-C₁₀, aromatic diamine in the form of monomer or oligomer, examples being m- and p-phenylenediamine, with a C₉-C₂₀, preferably C₉-C₁₈, arylaliphatic dicarboxylic acid or derivatives thereof, such as chlorides, examples being o-, m-, and p-phenylenediacetic acid, a C₇-C₂₀, preferably C₈-C₁₈, arylaliphatic diamine in the form of monomer or oligomer, examples being m- and p-xylylenediamine, with a C₂-C₂₀, preferably C₂-C₁₄, aliphatic dicarboxylic acid or mono- or dinitriles thereof, examples being sebacic acid, dodecanedioic acid, adipic acid, sebaconitrile, decanonitrile, and adiponitrile, a C₇-C₂₀, preferably C₈-C₁₈, arylaliphatic diamine in the form of monomer or oligomer, examples being m- and p-xylylenediamine, with a C₆-C₂₀, preferably C₆-C₁₀, aromatic dicarboxylic acid or derivatives thereof, such as chlorides, examples being 2,6-naphthalenedicarboxylic acid, or preferably isophthalic acid or terephthalic acid, a C₇-C₂₀, preferably C₈-C₁₈, arylaliphatic diamine in the form of monomer or oligomer, examples being m- and p-xylylenediamine, with a C₉-C₂₀, preferably C₉-C₁₈, arylaliphatic dicarboxylic acid or derivatives thereof, such as chlorides, examples being o-, m-, and p-phenylenediacetic acid, and also homopolymers, copolymers, mixtures, and grafts of these starting monomers or starting oligomers.

Particular oligomers which may be used are the dimers, trimers, tetramers, pentamers, or hexamers of the monomers mentioned, or of mixtures of these monomers.

In one preferred embodiment, the lactam used is caprolactam, the diamine used comprises tetramethylenediamine, hexamethylenediamine, or a mixture of these, and the dicarboxylic acid used comprises adipic acid, sebacic acid, dodecanedioic acid, terephthalic acid, isophthalic acid, or a mixture of these. Caprolactam is particularly preferred as lactam, as are hexamethylenediamine as diamine and adipic acid or terephthalic acid or a mixture of these as dicarboxylic acid.

Particular preference is given here to those starting monomers or starting oligomers which during the polymerization give the polyamides nylon-6, nylon-6,6, nylon-4,6, nylon-6,10, nylon-6,12, nylon-7, nylon-11, nylon-12 or the aramids polymetaphenylene-isophthalamide or polyparaphenyleneterephthamide, in particular to those which give nylon-6 or nylon-6,6.

In one preferred embodiment, use may be made of one or more chain regulators during preparation of the polyamides. Compounds which may be used advantageously as chain regulators are those which have one or more, for example two, three, or four, and in the case of systems in the form of fibers preferably two, amino groups reactive in polyamide formation, or one or more, for example two, three, or four, and in the case of systems in the form of fibers preferably two, carboxy groups reactive in polyamide formation.

In the first case the result is polyamides in which the monomers and chain regulators used to prepare the polyamide have more of the amine groups used to form the polymer chain, or of their equivalents, than of carboxylic acid groups used to form the polymer chain, or their equivalents.

In the second case the result is polyamides in which the monomers and chain regulators used to prepare the polyamide have more of the carboxylic acid groups used to form the polymer chain, or of their equivalents, than of amine groups used to form the polymer chain, or their equivalents.

Chain regulators which may be used with advantage are monocarboxylic acids, examples being alkanecarboxylic acids, such as acetic acid and propionic acid, and other examples being a benzene- or naphthalenemonocarboxylic acid, such as benzoic acid, and dicarboxylic acids, such as C₄-C₁₀ alkanedicarboxylic acid, e.g. adipic acid, azelaic acid, sebacic acid, dodecanedioic acid, C₅-C₈ cycloalkanedicarboxylic acid, for example cyclohexane-1,4-dicarboxylic acid, or a benzene- or naphthalenedicarboxylic acid, such as terephthalic acid, isophthalic acid, naphthalene-2,6-dicarboxylic acid, and C₂-C₂₀, preferably C₂-C₁₂, alkylamines, such as cyclohexylamine, C₆-C₂₀, preferably C₆-C₁₀, aromatic monoamines, such as aniline, or C₇-C₂₀, preferably C₈-C₁₈, arylaliphatic monoamines, such as benzylamine, and C₄-C₁₀ alkanediamines, e.g. hexamethylenediamine.

The chain regulators may be unsubstituted or substituted, for example with aliphatic groups, preferably C₁-C₈-alkyl groups, such as methyl, ethyl, isopropyl, n-propyl, n-butyl, isobutyl, sec-butyl, n-pentyl, n-hexyl, n-heptyl, n-octyl, 2-ethylhexyl, OH, =O, C₁-C₈-alkoxy, COOH, C₂-C₆-carbalkoxy, C₁-C₁₀-acyloxy, or C₁-C₈-alkylamino, or sulfonic acid or salts thereof, such as alkali metal or alkaline earth metal salts, cyano, or halogens, such as fluorine, chlorine, bromine. Examples of substituted chain regulators are sulfoisophthalic acid, the alkali metal or alkaline earth metal salts thereof, such as the lithium salts, sodium salts, or potassium salts, sulfoisophthalic esters, for example those with C₁-C₁₆ alkanols, and sulfoisophthalic mono- or diamides, in particular with monomers suitable for forming polyamides and bearing at least one amino group, for example hexamethylenediamine or 6-aminocaproic acid.

Chain regulators used with preference are sterically hindered piperidine derivatives of the formula

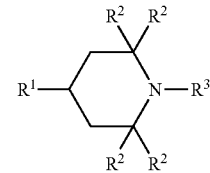

where

R¹ is a functional group capable of amide formation with respect to the polymer chain of the polyamide, preferably a —(NH)R⁵ group, where R⁵ is hydrogen or $C_1$-$C_8$-alkyl, or is a carboxy group or a carboxy derivative or a —$(CH_2)_x$(NH)$R^5$ group where X is from 1 to 6 and $R^5$ is hydrogen or $C_1$-$C_8$-alkyl, or is a —$(CH_2)_y$COOH group where Y is from 1 to 6, or is an acid derivative of —$(CH_2)_y$COOH where Y is from 1 to 6, and in particular is an —$NH_2$ group, $R^2$ is an alkyl group, preferably a $C_1$-$C_4$-alkyl group, such as methyl, ethyl, n-propyl, isopropyl, n-butyl, isobutyl, sec-butyl, sec-butyl, in particular a methyl group, $R^3$ is hydrogen, $C_1$-$C_4$-alkyl, or O—$R^4$, where $R^4$ is hydrogen or $C_1$-$C_7$-alkyl, and in particular $R^3$ is hydrogen.

In compounds of this type, steric hindrance usually prevents reaction of the tertiary, and in particular the secondary, amino groups of the piperidine ring system.

A particularly preferred sterically hindered piperidine derivative is 4-amino-2,2,6,6-tetramethylpiperidine.

A chain regulator may be used advantageously in amounts of at least 0.001 mol %, preferably at least 0.01 mol %, in particular at least 0.03 mol %, particularly preferably at least 0.08 mol %, based on 1 mole of amide groups of the polyamide.

A chain regulator may advantageously be used in amounts of not more than 2.0 mol %, preferably not more than 1 mol %, in particular not more than 0.6 mol %, particularly preferably not more than 0.5 mol %, based on 1 mole of amide groups of the polyamide.

According to the invention, the polyamide contains a monoolefinically unsaturated compound chemically bonded at the end of the polymer chain.

For the purposes of the present invention, the term monoolefinically unsaturated compound includes mixtures of these monoolefinically unsaturated compounds.

As monoolefinically unsaturated compound it is advantageous to use a monoolefinically unsaturated monocarboxylic acid.

As monoolefinically unsaturated compound it is advantageous to use a monoolefinically unsaturated monoamine.

As monoolefinically unsaturated compound use may advantageously be made of a terminally olefinically unsaturated compound.

In the case of a monoolefinically unsaturated monocarboxylic acid as monoolefinically unsaturated compound, use may in particular be made of a terminally olefinically unsaturated, linear, unbranched alkenemonocarboxylic acid, particularly preferably one of the formula

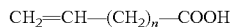

where n=1, 2, 3, 4, 5, 6, 7, 8, 9, 10, 11, 12, in particular 3.

The monoolefinically unsaturated monocarboxylic acids and their preparation are known per se.

The monoolefinically unsaturated monoamines and their preparation are known per se.

The content of monoolefinically unsaturated compound may advantageously be at least 0.001 mol %, preferably at least 0.01 mol %, in particular at least 0.03 mol %, particularly preferably at least 0.08 mol %, based on 1 mole of amide groups of the polyamide.

The content of monoolefinically unsaturated compound may advantageously be not more than 2.0 mol %, preferably not more than 1 mol %, in particular not more than 0.6 mol %, particularly preferably not more than 0.5 mol %, based on 1 mole of amide groups of the polyamide.

The polyamides of the invention can be obtained by reacting suitable monomers, oligomers, or mixtures of these suitable for forming a polyamide to give a polyamide in the presence of a monoolefinically unsaturated compound or a compound which under the reaction conditions for preparing the polyamide makes available the monoolefinically unsaturated compound.

The compound used to make available the monoolefinically unsaturated monocarboxylic acid under the reaction conditions for preparing the polyamide may be one where the olefinic double bond is made available under the reaction conditions, for example an amino acid which forms the corresponding monoolefinically unsaturated monocarboxylic acid with elimination of ammonia, or a hydroxy acid which forms the corresponding monoolefinically unsaturated monocarboxylic acid with elimination of water. In the case of the preferred terminal olefinically unsaturated monocarboxylic acids, particular preference is given to the terminal amino or hydroxy compounds. The compounds may also be those where the carboxylic acid group is made available under the reaction conditions, for example nitrites, esters, or amides. The compounds used to make available the monoolefinically unsaturated monocarboxylic acid under the reaction conditions for preparing the polyamide may also be a compound where both the olefinic double bond and the carboxylic acid group are made available under the reaction conditions, for example amino nitrites, amino esters, amino amides, hydroxy nitrites, hydroxy esters, or hydroxy amides.

The compound used to make available the monoolefinically unsaturated monoamine under the reaction conditions for preparing the polyamide may be a compound where the olefinic double bond is made available under the reaction conditions, for example a diamine which forms the corresponding monoolefinically unsaturated monoamine with elimination of ammonia, or a hydroxy amine which forms the corresponding monoolefinically unsaturated monoamine with elimination of water. In the case of the preferred terminal olefinically unsaturated monoamines, particular preference is given to the terminal amino or hydroxy compounds. Use may also be made of compounds where the amine group is made available under the reaction conditions, for example amides. Other compounds which can be used to make available the monoolefinically unsaturated monoamine under the reaction conditions for preparing the polyamide are those where both the olefinic double bond and the amine group are made available under the reaction conditions, for example diamino monoamides or hydroxy amino amides.

To prepare the polyamides of the invention, use may be made of the conventional process conditions for preparing polyamides from the corresponding monomers, for example as described in DE-A-14 95 198, DE-A-25 58 480, EP-A-129 196, DE-A-19 709 390, DE-A-35 34 817, WO 99/38908, WO 99/43734, WO 99/43732, WO 00/24808, WO 01/56984 or in Polymerization Processes, Interscience, New York, 1977, pp. 424-467, in particular pp. 444-446.

In one preferred embodiment, the polymerization or polycondensation may be carried out by the process of the invention in the presence of at least one pigment. Preferred pigments are titanium dioxide, preferably in the anatase or rutile crystalline form, or inorganic or organic colorant compounds. The pigments are preferably added in amounts of from 0 to 5 parts by weight, in particular from 0.02 to 2 parts by weight, based in each case on 100 parts by weight of polyamide. The pigments may be introduced to the reactor with the starting materials or separately therefrom.

The polyamides of the invention may be linked in a controlled manner to obtain higher-molecular-weight polyamides. The formation of high-molecular-weight linear polyamides is particularly advantageous here. The formation of three-dimensionally crosslinked polyamides is also particularly advantageous here.

The crosslinking may use processes known per se for the polymerization of olefinically unsaturated compounds, for example addition of suitable initiators or irradiation with UV light.

The polyamides of the invention, and their crosslinking products, may be used advantageously for producing fibers, films, or moldings which comprise this polyamide, or in particular consist of this polyamide.

EXAMPLES

In the examples, solution viscosity was measured as relative solution viscosity in 96% sulfuric acid to DIN 51562-1 to -4.

For this, 1 g of polymer was weighed out for 100 ml of solution, 45 and the throughflow time was measured in a Ubbelohde viscometer in comparison with the pure solvent.

Example 1

350 g (3.1 mol) of caprolactam, 35 g of demineralized water, and 0.8 g ($7*10^{-3}$ mol) of 5-hexenoic acid (purity 99%) were heated under nitrogen to an internal temperature of 270° C. in a laboratory autoclave, and then immediately depressurized to atmospheric pressure within one hour, post-condensed for 60 minutes, and discharged.

The discharged polyamide was granulated, extracted with boiling water to remove caprolactam and oligomers, and then dried in a vacuum drying cabinet. The dried extracted granules were heat-conditioned for various times in the solid phase at 160° C. (5 h, 10 h, 20 h, 30 h).

Table 1 below shows the resultant relative solution viscosities after various heat-conditioning times.

TABLE 1

| Heat-conditioning time | 0 h | 10 h | 15 h | 20 h | 30 h |
|---|---|---|---|---|---|
| Relative solution viscosity | 2.42 | 2.70 | 2.79 | 2.84 | 2.98 |

Example 2

The melt behavior of three polyamide specimens from Example 1 was studied. For this, oscillatory shear measurements were made at 250° C. and melt viscosity measurements were carried out to ISO 11433. The zero-shear viscosity $\eta_0$, i.e. the melt viscosity at zero shear, is a function of the molar mass $M_n$ for linear polyamides with Schulz-Flory distribution:

$$\eta_0 \sim M_n^{3,5}$$

The molar mass was determined by light scattering. FIG. 1 shows that the polyamides prepared as in Example 1 are linear:

Example 3

Example 1 was repeated in a pressure vessel using the following mixture: 400 kg (3571 mol) of caprolactam, 40 kg of demineralized water, and 0.914 kg (8 mol) of 5-hexenoic acid. The polyamide discharged was extracted, dried, and heat-conditioned in the solid phase to a relative solution viscosity of RV=2.74.

An extruder was then used to compound 30% by weight of OCF 123 D 10 P glass fibers (from OCF) and 7% by weight of Lupolen KR 1270 rubber (from BASF Aktiengesellschaft) into the material (the percentages being based on the finished compounded material). The relative solution viscosity after compounding was 2.83.

Comparative Example

Example 3 was repeated with the modification that 0.592 kg (8 mol) of propionic acid was used instead of 5-hexenoic acid.

The relative solution viscosity after compounding was 2.83.

Melt volume rate (MVR) measurement to ISO 1133

Melt volume rate (MVR) measurements were carried out to ISO 1133 on the compounded materials from Example 3 and from the comparative examples. The melt temperature here was 275° C. and the ram weight was 5 kg.

Figure 2:
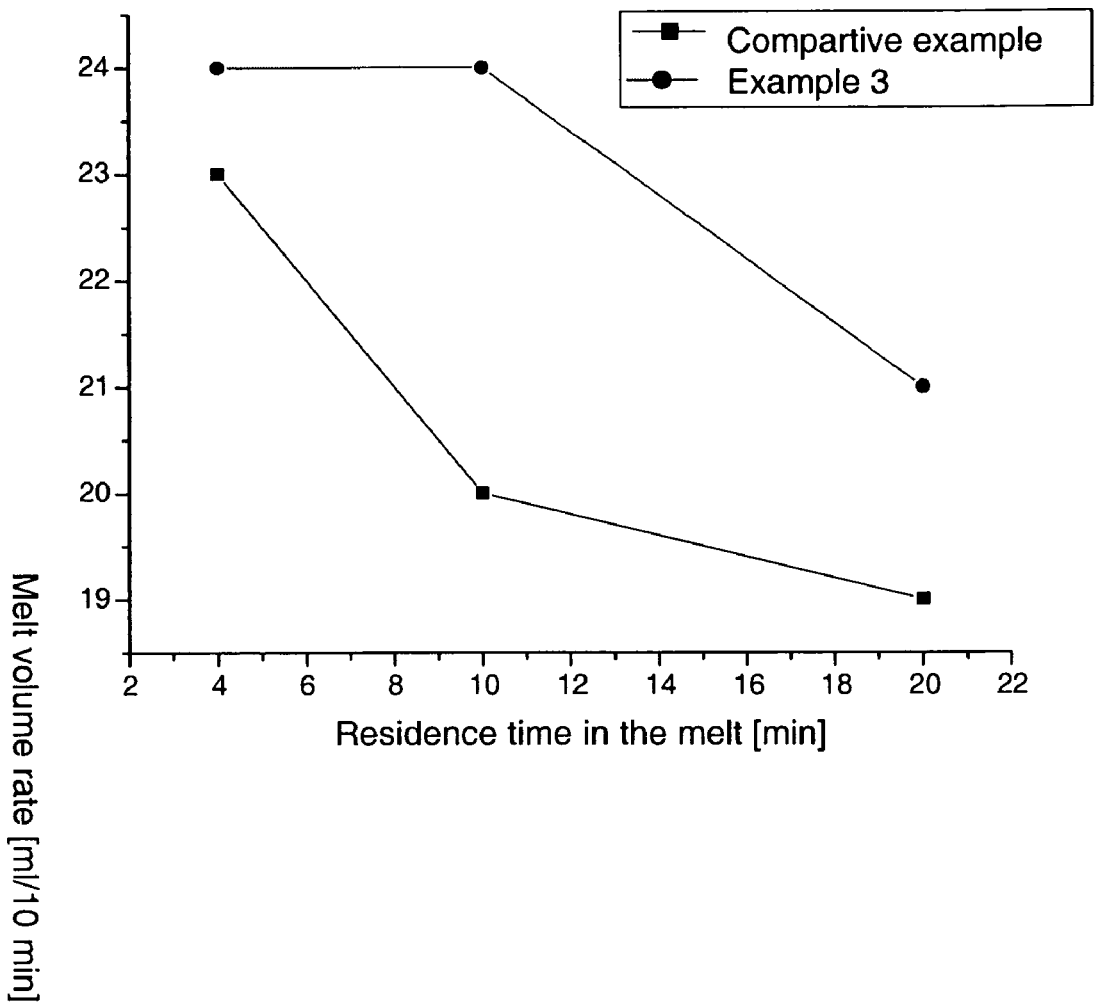

FIG. 2 shows the comparison of the melt volume rate for various residence times in the melt.

Flowability in two types of flow spirals (diameter 1.5 mm, 2 mm) was tested on the compounded materials from Example 3 and the comparative example. The temperature of the spirals was 280° C. Flow path was measured in cm. Table 2 below shows the measurements:

TABLE 2

|  | Example 4 | Comparative example |
|---|---|---|
| Flow spiral (1.5 mm) | 25.9 cm | 23.8 cm |
| Flow spiral (2 mm) | 39.4 cm | 36.8 cm |

We claim:
1. A polyamide which contains a monoolefinically unsaturated monocarboxylic acid of the formula $CH_2$=CH—$(CH_2)_3$—COOH chemically bonded at the end of the polymer chain via an amide group.
2. A polyamide as claimed in claim 1, where the content of the monoolefinically unsaturated monocarboxylic acid of the formula $CH_2$=CH—$(CH_2)_3$—COOH is in the range from 0.001 to 2 mol %, based on 1 mole of amide groups of the polyamide.
3. A polyamide obtained by crosslinking a polyamide as claimed in claim 1.
4. A fiber, a film, or a molding, comprising a polyamide as claimed in claim 1.
5. A process for preparing a polyamide, which comprises carrying out the reaction of monomers suitable for forming a polyamide to give a polyamide in the presence of a monoolefinically unsaturated monocarboxylic acid of the formula $CH_2$=CH—$(CH_2)_3$—COOH.
6. A process for preparing a polyamide, which comprises carrying out the reaction of oligomers suitable for forming a polyamide to give a polyamide in the presence of a monoolefinically unsaturated monocarboxylic acid of the formula $CH_2$=CH—$(CH_2)_3$—COOH.

* * * * *